United States Patent
Kiryu

(10) Patent No.: US 11,438,323 B2
(45) Date of Patent: Sep. 6, 2022

(54) INFORMATION PROCESSING APPARATUS, INFORMATION PROCESSING SYSTEM, AND NON-TRANSITORY COMPUTER READABLE MEDIUM STORING PROGRAM

(71) Applicant: FUJIFILM BUSINESS INNOVATION CORP., Tokyo (JP)

(72) Inventor: Shunsuke Kiryu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 157 days.

(21) Appl. No.: 16/889,088

(22) Filed: Jun. 1, 2020

(65) Prior Publication Data
US 2021/0105259 A1  Apr. 8, 2021

(30) Foreign Application Priority Data
Oct. 4, 2019  (JP) .............................. JP2019-183645

(51) Int. Cl.
   *H04L 9/40*  (2022.01)
(52) U.S. Cl.
   CPC ..................... *H04L 63/08* (2013.01)
(58) Field of Classification Search
   CPC ................ H04L 63/08; G06F 21/31
   See application file for complete search history.

(56) References Cited

U.S. PATENT DOCUMENTS

| | | | |
|---|---|---|---|
| 7,103,776 B1 * | 9/2006 | Hall | G06F 21/31 455/411 |
| 7,266,693 B1 * | 9/2007 | Potter | H04L 9/3226 713/169 |
| 8,392,719 B2 * | 3/2013 | Kawai | G06F 21/6281 713/183 |
| 8,875,255 B1 * | 10/2014 | Dotan | H04L 63/08 713/182 |
| 10,181,041 B2 * | 1/2019 | Bhansali | G06F 21/575 |
| 2002/0013904 A1 * | 1/2002 | Gardner | G06Q 20/04 713/184 |
| 2003/0093699 A1 * | 5/2003 | Banning | G06F 21/36 726/3 |
| 2003/0208697 A1 * | 11/2003 | Gardner | G06Q 20/385 713/184 |
| 2005/0005131 A1 * | 1/2005 | Yoshida | G06F 21/31 713/183 |

(Continued)

FOREIGN PATENT DOCUMENTS

JP  2016-177699 A  10/2016

*Primary Examiner* — Aravind K Moorthy
(74) *Attorney, Agent, or Firm* — Oliff PLC

(57) ABSTRACT

An information processing apparatus includes: a memory and a processor, the memory being configured to, for each of users, store authentication information and fixed information in association with the user, the authentication information being variable and unique, the fixed information being invariant and unique, the processor being configured to receive the authentication information and the fixed information from an apparatus utilized by the user, and cause authentication of the user to the apparatus to succeed or fail according to a result of comparison between a combination of the received authentication information and fixed information and a combination of the authentication information and the fixed information stored in the memory.

8 Claims, 7 Drawing Sheets

(56) References Cited

U.S. PATENT DOCUMENTS

| | | | |
|---|---|---|---|
| 2007/0124810 A1* | 5/2007 | Sigalow | G06Q 20/40 726/9 |
| 2008/0082832 A1* | 4/2008 | McDougal | H04L 63/0846 726/2 |
| 2009/0172810 A1* | 7/2009 | Won | G06F 21/36 726/19 |
| 2010/0239087 A1* | 9/2010 | Chaisson | H04L 9/0631 380/44 |
| 2011/0133443 A1* | 6/2011 | Silva | G06F 21/36 283/72 |
| 2012/0079571 A1* | 3/2012 | Evan | H04L 9/3226 726/6 |
| 2012/0204256 A1* | 8/2012 | Craine | G06F 21/83 726/18 |
| 2013/0298223 A1* | 11/2013 | Li | G06F 21/31 726/18 |
| 2014/0208406 A1* | 7/2014 | Austin | H04L 63/0272 726/7 |
| 2015/0026783 A1* | 1/2015 | Tseng | H04L 63/0846 726/6 |
| 2015/0207790 A1* | 7/2015 | Lu | G06F 21/44 726/9 |
| 2015/0349958 A1* | 12/2015 | Lindell | H04L 9/3228 713/168 |
| 2016/0080594 A1* | 3/2016 | Kuroda | H04N 1/00474 358/1.15 |
| 2016/0149894 A1* | 5/2016 | Jneid | H04L 63/0876 726/7 |
| 2016/0212110 A1* | 7/2016 | Barkie | H04L 63/067 |
| 2017/0034168 A1* | 2/2017 | Wilson | H04L 63/0823 |
| 2017/0288872 A1* | 10/2017 | Lu | H04L 9/0869 |
| 2017/0338959 A1* | 11/2017 | Hong | H04W 48/04 |
| 2018/0145957 A1* | 5/2018 | Kasibhatla | H04L 63/1475 |
| 2018/0234414 A1* | 8/2018 | Littrell | H04L 9/3239 |
| 2018/0255053 A1* | 9/2018 | Bhabbur | H04L 63/0838 |
| 2018/0285556 A1* | 10/2018 | Beatson | G06F 21/72 |
| 2018/0300473 A1* | 10/2018 | O'Dell | G06F 21/46 |
| 2018/0359389 A1* | 12/2018 | Hori | H04N 1/4433 |
| 2019/0020769 A1* | 1/2019 | Nakano | H04N 1/00811 |
| 2019/0065731 A1* | 2/2019 | Brocious | H04L 9/3228 |
| 2019/0065789 A1* | 2/2019 | Gonchar | G06F 21/88 |
| 2019/0089694 A1* | 3/2019 | Newton | G06F 21/45 |
| 2019/0236580 A1* | 8/2019 | Nakamura | G07G 1/12 |
| 2019/0272548 A1* | 9/2019 | Korb | G06Q 30/018 |
| 2019/0362065 A1* | 11/2019 | Xiao | G06F 21/46 |
| 2019/0372967 A1* | 12/2019 | Cho | H04L 63/0838 |
| 2019/0372989 A1* | 12/2019 | Shultz | G06F 21/45 |
| 2020/0134166 A1* | 4/2020 | Hassan | H04L 63/0846 |
| 2020/0169548 A1* | 5/2020 | Yin | H04L 9/3228 |
| 2021/0218731 A1* | 7/2021 | Ma | H04L 63/20 |

* cited by examiner

FIG. 4

| IC CARD ID | USER ID | OBJECT ID |
|---|---|---|
| 11111 | USER A | abcdefgh |
| ... | ... | ... |

FIG. 5

| ACTUAL USER | USER ID | OBJECT ID | ELECTRONIC MAIL ADDRESS | ... |
|---|---|---|---|---|
| USER α | USER A | abcdefgh | User1@xxx.yyy | ... |
| ... | ... | ... | ... | ... |

FIG. 6

| CASE | USER ID (VARIABLE AND UNIQUE AUTHENTICATION INFORMATION) | OBJECT ID (INVARIANT AND UNIQUE AUTHENTICATION INFORMATION) | PROCESSING |
|---|---|---|---|
| CASE 1 | MATCHED | MATCHED | AUTHENTICATION IS SUCCESSFUL |
| CASE 2 | MATCHED | NOT MATCHED | AUTHENTICATION IS FAILED |
| CASE 3 | NOT MATCHED | MATCHED | AUTHENTICATION IS SUCCESSFUL |
| CASE 4 | NOT MATCHED | NOT MATCHED | AUTHENTICATION IS FAILED |

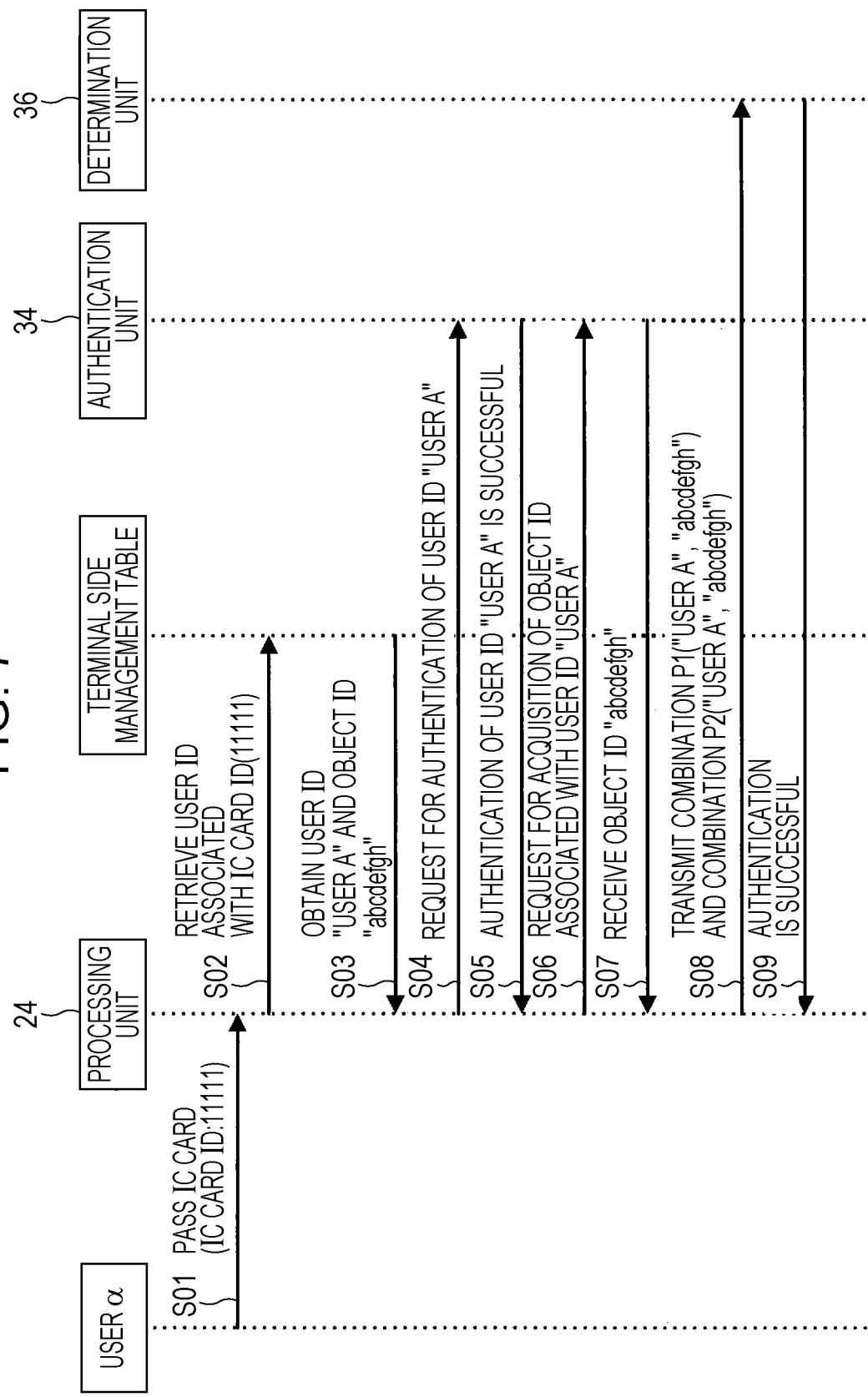

FIG. 8

| ACTUAL USER | USER ID | OBJECT ID | ELECTRONIC MAIL ADDRESS | ... |
|---|---|---|---|---|
| USER α | USER C | abcdefgh | User1@xxx.yyy | ... |
| USER β | USER A | ijklmnopq | User2@xxx.yyy | ... |
| ... | ... | ... | ... | ... |

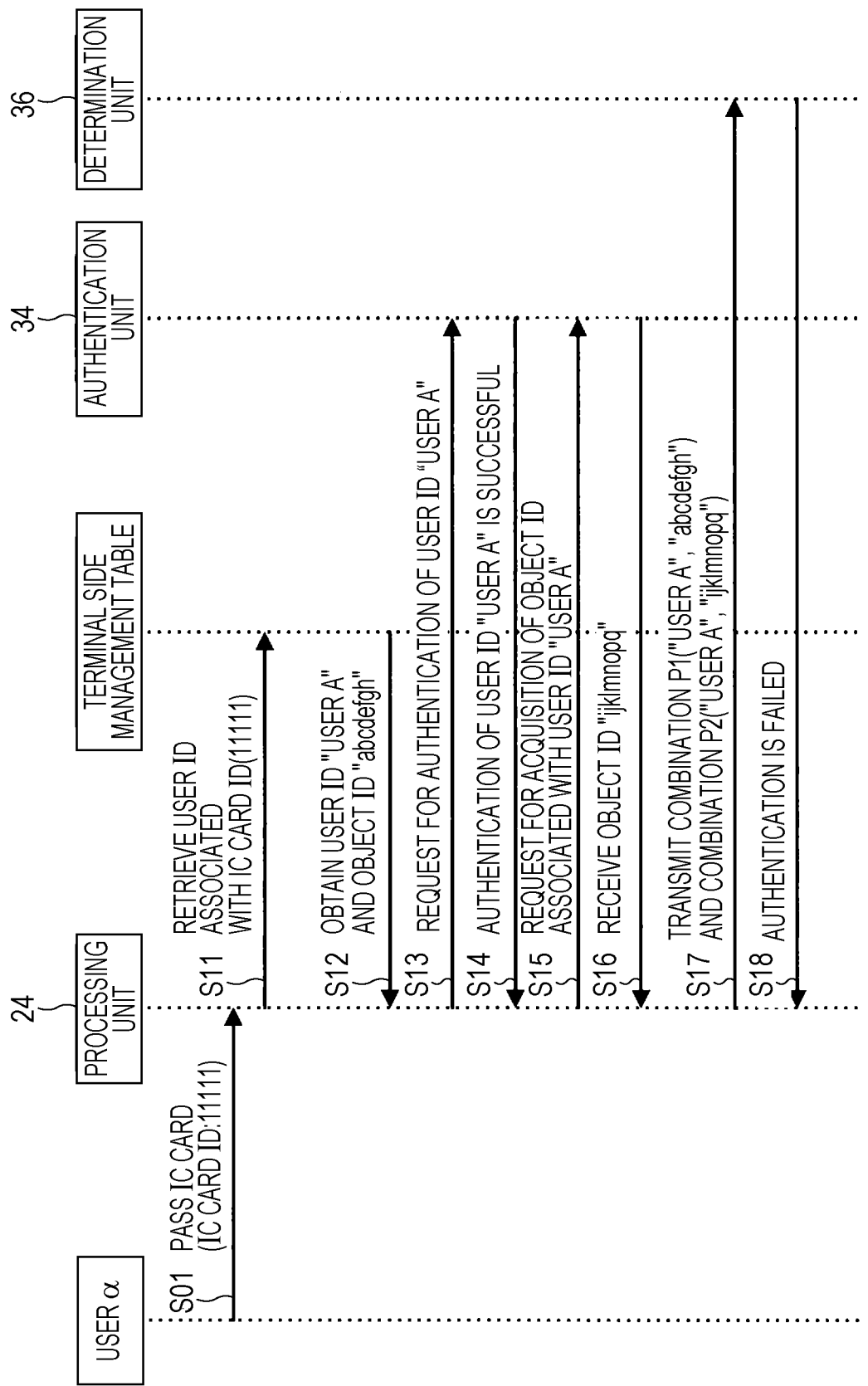

FIG. 10

<TERMINAL SIDE MANAGEMENT TABLE>

| IC CARD ID | USER ID | OBJECT ID |
|---|---|---|
| 11111 | USER A | abcde |
| ... | ... | ... |

<SERVER SIDE MANAGEMENT TABLE>

| ACTUAL USER | USER ID | OBJECT ID | ELECTRONIC MAIL ADDRESS |
|---|---|---|---|
| USER α | USER A | abcde | User1@xxx.yyy |
| ... | ... | ... | ... |

FIG. 11

<TERMINAL SIDE MANAGEMENT TABLE>

| IC CARD ID | USER ID | OBJECT ID |
|---|---|---|
| 11111 | USER A | abcdefgh |
| ... | ... | ... |

<SERVER SIDE MANAGEMENT TABLE>

| ACTUAL USER | USER ID | OBJECT ID | ELECTRONIC MAIL ADDRESS |
|---|---|---|---|
| USER α | USER C | abcde | User1@xxx.yyy |
| USER β | USER A | fghij | User2@xxx.yyy |
| ... | ... | ... | ... |

FIG. 12

<TERMINAL SIDE MANAGEMENT TABLE>

| IC CARD ID | USER ID | OBJECT ID | TOKEN |
|---|---|---|---|
| 11111 | USER A | abcde | TOKEN A |
| 22222 | USER B | fghij | TOKEN B |
| ... | ... | ... | ... |

<SERVER SIDE MANAGEMENT TABLE>

| ACTUAL USER | USER ID | OBJECT ID | ELECTRONIC MAIL ADDRESS | TOKEN |
|---|---|---|---|---|
| USER α | USER A | abcde | User1@xxx.yyy | TOKEN A |
| USER β | USER B | fghij | User2@xxx.yyy | TOKEN B |
| ... | ... | ... | ... | ... |

FIG. 13

<TERMINAL SIDE MANAGEMENT TABLE>

| IC CARD ID | USER ID | OBJECT ID | TOKEN |
|---|---|---|---|
| 11111 | USER A | abcde | TOKEN A |
| 22222 | USER B | fghij | TOKEN B |
| ... | ... | ... | ... |

<SERVER SIDE MANAGEMENT TABLE>

| ACTUAL USER | USER ID | OBJECT ID | ELECTRONIC MAIL ADDRESS | TOKEN |
|---|---|---|---|---|
| USER α | USER C | abcde | User1@xxx.yyy | TOKEN A |
| USER β | USER A | fghij | User2@xxx.yyy | TOKEN B |
| ... | ... | ... | ... | ... |

FIG. 14

<TERMINAL SIDE MANAGEMENT TABLE>

| IC CARD ID | USER ID | OBJECT ID | TOKEN |
|---|---|---|---|
| 11111 | USER C | abcde | TOKEN A |
| 22222 | USER B | fghij | TOKEN B |
| ... | ... | ... | ... |

<SERVER SIDE MANAGEMENT TABLE>

| ACTUAL USER | USER ID | OBJECT ID | ELECTRONIC MAIL ADDRESS | TOKEN |
|---|---|---|---|---|
| USER α | USER C | abcde | User1@xxx.yyy | TOKEN A |
| USER β | USER A | fghij | User2@xxx.yyy | TOKEN B |
| ... | ... | ... | ... | ... |

INFORMATION PROCESSING APPARATUS, INFORMATION PROCESSING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-183645 filed on Oct. 4, 2019.

BACKGROUND

(i) Technical Field

The present disclosure relates to an information processing apparatus, an information processing system, and a non-transitory computer readable medium storing a program.

(ii) Related Art

There is a mechanism that does not authenticate a user by an apparatus utilized by the user, but authenticates the user by an authentication server other than the apparatus and when the authentication is successful, allows the user to utilize the apparatus.

Japanese Unexamined Patent Application Publication No. 2016-177699 states a system that manages user IDs each associated with the ID of an IC card not managed by an external authentication server, and performs authentication by the external authentication server using a user ID read from the IC card.

SUMMARY

When for each of users, variable and unique authentication information is stored in an authentication server, and a user is authenticated to an apparatus by the authentication server using the authentication information, change in the authentication information stored in the authentication server may cause a situation in which authentication which should be successful fails or authentication which should be failed succeeds. For instance, a situation may occur in which when first authentication information stored in the authentication server in association with a first user is newly associated with a second user other than the first user in the authentication server, and the first user is newly associated with another second authentication information in the authentication server. In this situation, when the first user requests authentication to the authentication server using the original first authentication information of the first user, the first user is successfully authenticated as the second user.

Aspects of non-limiting embodiments of the present disclosure relate to a technique to improve the accuracy of authentication of each user, as compared with when the user is authenticated using only variable and unique authentication information.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a memory and a processor, the memory being configured to, for each of users, store authentication information and fixed information in association with the user, the authentication information being variable and unique, the fixed information being invariant and unique, the processor being configured to receive the authentication information and the fixed information from an apparatus utilized by the user, and cause authentication of the user to the apparatus to succeed or fail according to a result of comparison between a combination of the received authentication information and fixed information and a combination of the authentication information and the fixed information stored in the memory.

BRIEF DESCRIPTION OF THE DRAWINGS

Exemplary embodiment of the present disclosure will be described in detail based on the following figures, wherein:

FIG. 4 is a chart illustrating a terminal side management table;

FIG. 5 is a chart illustrating a server side management table;

FIG. 6 is a chart illustrating the processing performed by a determination unit;

FIG. 7 is a sequence diagram illustrating the flow of processing performed by the information processing system;

FIG. 8 is a chart illustrating a server side management table;

FIG. 9 is a sequence diagram illustrating the flow of processing performed by the information processing system;

FIG. 10 is a chart illustrating the terminal side management table and the server side management table;

FIG. 11 is a chart illustrating the terminal side management table and the server side management table;

FIG. 12 is a chart illustrating the terminal side management table and the server side management table;

FIG. 13 is a chart illustrating the terminal side management table and the server side management table; and FIG. 14 is a chart illustrating the terminal side management table and the server side management table.

DETAILED DESCRIPTION

Figure 1:
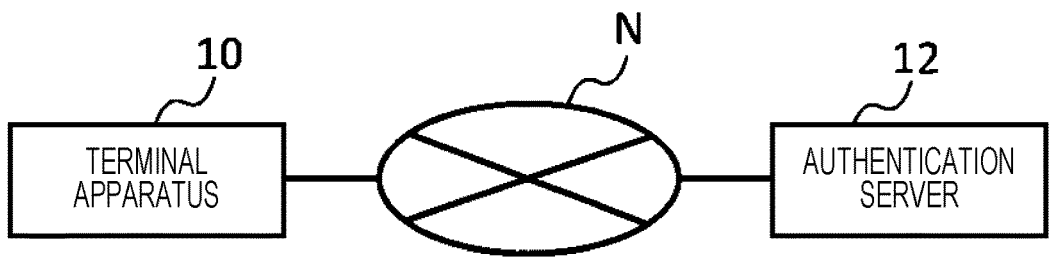
FIG. 1 is a block diagram illustrating the configuration of an information processing system according to an exemplary embodiment.

An information processing system according to an exemplary embodiment will be described with reference to FIG. 1. FIG. 1 illustrates an example of the configuration of the information processing system according to the exemplary embodiment.

As an example, the information processing system according to the exemplary embodiment includes one or more terminal apparatuses 10 and an authentication server 12.

The terminal apparatuses 10 and the authentication server 12 each have a function of communicating with other apparatuses. The communication may be a wired communication utilizing a cable or a wireless communication. Specifically, each apparatus may be physically connected to other apparatuses via a cable to transmit or receive information, or may transmit or receive information by a wireless communication. For instance, near-field wireless communication or Wi-Fi (registered trademark) is used as the wireless communication. A wireless communication in a standard other than those standards may be used. The near-field wireless communication is, for instance, Bluetooth (registered trademark), Radio Frequency Identifier (RFID), or NFC. Each apparatus may communicate with other apparatuses through a communication path N, such as the Internet and a local area network (LAN).

The terminal apparatus 10 is an apparatus utilized by a user. The terminal apparatus 10 is, for instance, a personal computer (hereinafter referred to as a "PC"), a tablet PC, a smartphone, a mobile phone, an image processing apparatus, or another apparatus. The image processing apparatus is an apparatus (for instance, a multifunctional apparatus) having at least one of the scan function, the print function, the copy function, and the facsimile function, for instance. Needless to say, the apparatus 10 may be other than these apparatuses.

The authentication server 12 is an apparatus configured to authenticate users. For instance, the authentication server 12 authenticates a user to the terminal apparatus 10. When authentication of a user to the terminal apparatus 10 succeeds, the user is allowed to log in to the terminal apparatus 10 and to utilize the function thereof which is permitted to be used when the login is made. When authentication of a user to the terminal apparatus 10 fails, the user cannot log in to the terminal apparatus 10, and is not allowed to utilize the function thereof which is permitted to be used when the login is made. In addition, the authentication server 12 may authenticate a user to the authentication server 12. The authentication server 12 is an example of the image processing apparatus.

Figure 2:
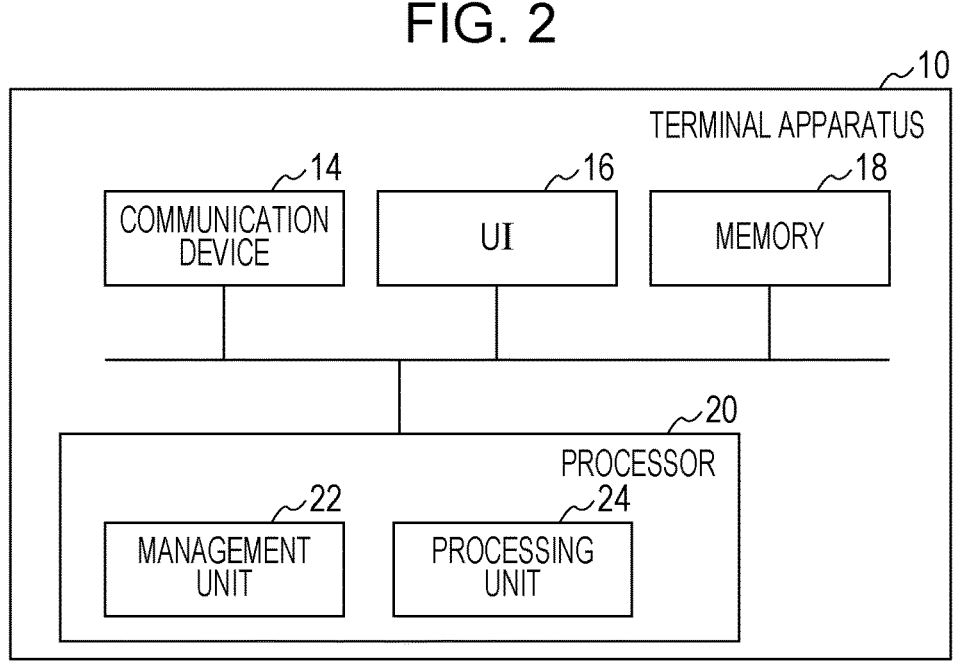
FIG. 2 is a block diagram illustrating the configuration of a terminal apparatus according to the exemplary embodiment.

The configuration of the terminal apparatus 10 will be described with reference to FIG. 2. FIG. 2 illustrates an example of the hardware configuration and the functional configuration of the terminal apparatus 10.

The terminal apparatus 10 includes, for instance, a communication device 14, an UI 16, a memory 18, and a processor 20. When the terminal apparatus 10 is an image processing apparatus such as a multifunctional apparatus, the terminal apparatus 10 further includes a scanner and a printer, the scanner being an apparatus that generates image data by optically reading a document, the printer being an apparatus that prints an image on a sheet of paper.

The communication device 14 is a communication interface, and has a function of transmitting information to other apparatuses and a function of receiving information transmitted from other apparatuses. The communication device 14 may have a wireless communication function or may have a wired communication function. The communication device 14 may communicate with other apparatuses by utilizing a near-field wireless communication, or may communicate with other apparatuses via a communication path such as an LAN or the Internet.

The UI 16 is a user interface, and includes a display device and an operation device. The display device is a liquid crystal display, an EL display or the like. The operation device is a keyboard, an input key, an operation panel or the like. The UI 16 may be an UI, such as a touch panel, which serves as both a display device and an operation device. Alternatively, a microphone may be included in the UI 16, and a speaker that outputs sound may be included in the UI 16.

The memory 18 is a storage device that includes one or more storage regions for storing various types of information. The memory 18 is, for instance, a hard disk drive, a RAM, a DRAM, a ROM, an optical disc, another storage device, or a combination thereof. One or more memories 18 are included in the terminal apparatus 10.

The processor 20 is configured to control the operation of the components of the terminal apparatus 10. For instance, the processor 20 may communicate with each apparatus using the communication device 14, may cause the display device of the UI 16 to display information, may receive information inputted via the UI 16, may store information in the memory 18, or may read information from the memory 18. The processor 20 may have a memory.

The terminal apparatus 10 includes a management unit 22 and a processing unit 24 as a functional configuration. The management unit 22 and the processing unit 24 are implemented by the processor 20.

The management unit 22 is configured to, for management information, manage authentication information and fixed information in association with each other, the authentication information being variable and unique, the fixed information being invariant and unique. For instance, these pieces of information are stored in the memory 18. The management information is for managing authentication information and fixed information, for instance, information associated with a user. A user is authenticated to the terminal apparatus 10 based on a combination of the authentication information and the fixed information. For instance, the authentication information is used for authentication of a user to the authentication server 12, and the fixed information is not used for authentication of a user to the authentication server 12. Here, "variable" means that information may be allowed to be changed. As described later, authentication information is stored in the authentication server 12, and the authentication information may be changed in the authentication server 12. Also, "invariant" means that information is not scheduled to be changed or information is not allowed to be changed.

The processing unit 24 is configured to, when a user is authenticated to the terminal apparatus 10, transmit various information to the management unit 22 and the authentication server 12, and receive various information from the management unit 22 and the authentication server 12.

Figure 3:
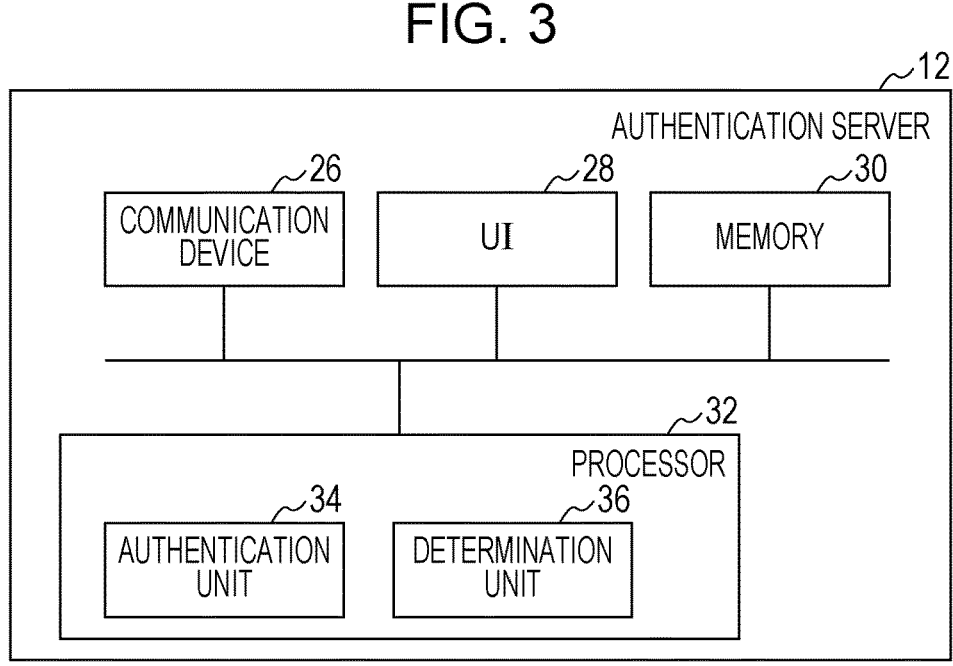
FIG. 3 is a block diagram illustrating the configuration of an authentication server according to the exemplary embodiment.

The configuration of the authentication server 12 will be described with reference to FIG. 3. FIG. 3 illustrates an example of the hardware configuration and the functional configuration of the authentication server 12.

The authentication server 12 includes, for instance, a communication device 26, an UI 28, a memory 30, and a processor 32.

The communication device 26 is a communication interface, and has a function of transmitting information to other apparatuses and a function of receiving information transmitted from other apparatuses. The communication device 26 may have a wireless communication function or may have a wired communication function. The communication device 26 may communicate with other apparatuses by utilizing a near-field wireless communication, or may communicate with other apparatuses via a communication path such as an LAN or the Internet.

The UI 28 is a user interface, and includes a display device and an operation device. The display device is a liquid crystal display, an EL display or the like. The operation device is a keyboard, an input key, an operation panel or the like. The UI 28 may be an UI, such as a touch panel, which serves as both a display device and an operation device. Alternatively, a microphone may be included in the UI 28, and a speaker that outputs sound may be included in the UI 28.

The memory 30 is a storage device that includes one or more storage regions for storing various types of information. The memory 30 is, for instance, a hard disk drive, a RAM, a DRAM, a ROM, an optical disc, another storage device, or a combination thereof. One or more memories 30 are included in the authentication server 12.

Each memory 30 stores unique authentication information and invariant and unique fixed information in association with each other for management information. The authentication information stored in the memory 30 may be changed by, for instance, the administrator of the authentication server 12.

The processor 32 is configured to control the operation of the components of the authentication server 12. For instance, the processor 32 may communicate with each apparatus using the communication device 26, may cause the display device of the UI 28 to display information, may receive information inputted via the UI 28, may store information in the memory 30, or may read information from the memory 30. The processor 32 may have a memory.

The authentication server 12 includes an authentication unit 34 and a determination unit 36 as a functional configuration. The authentication unit 34 and the determination unit 36 are implemented by the processor 32.

The authentication unit 34 is configured to authenticate a user to the authentication server 12 based on the authentication information. For instance, the authentication unit 34 receives authentication information transmitted from the terminal apparatus 10, compares the received authentication information with the authentication information stored in the memory 30, thereby authenticating a user to the authentication server 12. When the received authentication information is stored in the memory 30, authentication of the user to the authentication server 12 succeeds. When the received authentication information is not stored in the memory 30, authentication of the user to the authentication server 12 fails. For instance, when authentication of the user to the authentication server 12 succeeds, the user may be allowed to log in to the authentication server 12. When authentication of the user to the authentication server 12 fails, the user is not allowed to log in to the authentication server 12.

The determination unit 36 is configured to authenticate a user to the terminal apparatus 10 based on the authentication information and the fixed information. For instance, the determination unit 36 authenticates a user to the terminal apparatus 10 by comparing a combination of the authentication information and the fixed information transmitted from the terminal apparatus 10 with a combination of the authentication information and the fixed information stored in the memory 30. The determination unit 36 causes authentication of a user to the terminal apparatus 10 to succeed or fail according to a result of the comparison.

Hereinafter, an example of the authentication information and the fixed information managed by the terminal apparatus 10 and the management unit 22 will be described with reference to FIG. 4. FIG. 4 illustrates an example of a management table managed by the management unit 22 of the terminal apparatus 10. Hereinafter, the table managed by the management unit 22 of the terminal apparatus 10 is referred to as the "terminal side management table".

In the terminal side management table, for instance, for each user, an IC card ID, a user ID, and an object ID are associated with one another. A user ID corresponds to an example of variable and unique authentication information, and is information used for authentication of a user to the authentication server 12. An object ID corresponds to an example of invariant and unique fixed information. The user ID and the object ID are information used for authentication of a user to the terminal apparatus 10. The IC card ID corresponds to an example of management information for managing a user ID and an object ID. For instance, an IC card ID is recorded on an IC card used for authentication. The IC card ID is not managed by the authentication server 12. In the example illustrated in FIG. 4, an IC card ID "11111", a user ID "user A", and an object ID "abcdefgh" are associated with one another.

Hereinafter, for the sake of convenience of description, a combination of a user ID and an object ID registered in the terminal side management table is referred to as a "combination P1".

Hereinafter, an example of the authentication information and the fixed information managed by the authentication server 12 will be described with reference to FIG. 5. FIG. 5 illustrates an example of a management table managed by the authentication server 12. Hereinafter, the management table managed by the authentication server 12 is referred to as the "server side management table".

In the server side management table, for instance, for each user, a user ID and an object ID are associated with each other. Also, in the server side management table, as an example, an electronic mail address of a user is associated with a user ID and an object ID. This is merely an example, and an electronic mail address may not be associated with a user ID and an object ID. Information (for instance, the address of a storage region allocated to a user) other than the electronic mail address may be associated with a user ID and an object ID. An actual user is illustrated in FIG. 5. The actual user is associated with a user ID and an object ID. For instance, the actual user α is associated with the user ID "user A" and the object ID "abcdefgh". Although FIG. 5 illustrates the actual user, the illustration is for the sake of convenience of description, and the user is not registered in the server side management table.

Hereinafter, for the sake of convenience of description, a combination of a user ID and an object ID registered in the server side management table is referred to as a "combination P2".

Hereinafter, the processing performed by the determination unit 36 will be described in detail with reference to FIG. 6. FIG. 6 illustrates an example of the processing performed by the determination unit 36.

For instance, when a user passes an IC card of himself/herself over a reading device provided in the terminal apparatus 10, an IC card ID is read from the IC card by the reading device, the combination P1 of the user ID and the object ID associated with the IC card ID is identified in the terminal side management table. The combination P1 is transmitted from the terminal apparatus 10 to the authentication server 12, and the authentication server 12 receives the combination P1 transmitted from the terminal apparatus 10. The determination unit 36 compares the combination P1 with the combination P2 registered in the server side management table, and causes authentication of a user to the terminal apparatus 10 to succeed or fail according to a result of the comparison. FIG. 6 illustrates the processing for cases 1 to 4.

Processing for Case 1

The processing for the case 1 is performed when the user ID included in the combination P1 matches the user ID included in the combination P2, and the object ID included in the combination P1 matches the object ID included in the combination P2. In this case, the determination unit 36 determines that the user who has passed an IC card and the actual user associated with the combination P2 are the same user, and causes authentication of the user to the terminal apparatus 10 to succeed. In other words, when the combination P2 same as the combination P1 is registered in the server side management table, the determination unit 36 causes authentication of the user to the terminal apparatus 10 to succeed. For instance, a user who has succeeded in the authentication is allowed to log in to the terminal apparatus 10.

Processing for Case 2

The processing for the case 2 is performed when the user ID included in the combination P1 matches the user ID included in the combination P2, and the object ID included in the combination P1 does not match the object ID included in the combination P2. In this case, the determination unit 36 determines that the user who has passed an IC card and the actual user associated with the combination P2 are different users, and causes authentication of the user to the terminal apparatus 10 to fail. In other words, when the same user ID as the user ID included in the combination P1 is registered in the server side management table, and the object ID registered in the server side management table in association with the user ID is different from the object ID included in the combination P1, the determination unit 36 causes authentication of the user to the terminal apparatus 10 to fail. For instance, a user who has failed in the authentication is not allowed to log in to the terminal apparatus 10. For instance, when a user ID registered in the server side management table is made associated with another user (for instance, a user associated with an object ID different from the object ID included in the combination P1) different from the original user, the situation in the case 2 occurs.

When the situation in the case 2 occurs, the determination unit 36 may transmit to the terminal apparatus 10 information for inquiring whether or not the user ID and the object ID of a user are to be deleted from the server side management table, the user of which authentication to the terminal apparatus 10 has failed. For instance, a message such as "Would you like to delete the user ID and the object ID from the authentication server 12?" is transmitted from the authentication server 12 to the terminal apparatus 10, and is displayed on the display device of the UI 16 of the terminal apparatus 10. When a user gives instructions to delete the user ID and the object ID by operating the UI 16 of the terminal apparatus 10, information indicating the instructions is transmitted from the terminal apparatus 10 to the authentication server 12. When receiving the information indicating the instructions, the determination unit 36 deletes from the server side management table the user ID and the object ID of a user of which authentication to the terminal apparatus 10 has failed. It is to be noted that when an administrator or the like having the authority for deletion gives instructions to delete a user ID and an object ID, the determination unit 36 may delete the user ID and the object ID from the server side management table.

Processing for Case 3

The processing for the case 3 is performed when the user ID included in the combination P1 does not match the user ID included in the combination P2, and the object ID included in the combination P1 matches the object ID included in the combination P2. In this case, the determination unit 36 determines that the user who has passed an IC card and the actual user associated with the combination P2 are the same user, and causes authentication of the user to the terminal apparatus 10 to succeed. In other words, when the same object ID as the object ID included in the combination P1 is registered in the server side management table, and the user ID registered in the server side management table in association with the object ID is different from the user ID included in the combination P1, the determination unit 36 causes authentication of the user to the terminal apparatus 10 to succeed. For instance, when a user is authenticated by another authentication method using information other than the user ID serving as the authentication information, and the object ID included in the combination P1 matches the object ID included in the combination P2, the situation in the case 3 occurs. For instance, a token is obtained by successful another authentication method and authentication of a user to the terminal apparatus 10 may succeed by utilizing the token.

When the situation in the case 3 occurs, the processing unit 24 obtains from the authentication server 12 the user ID which is registered in the server side management table in association with the object ID included in the combination P1, and may update the user ID registered in the terminal side management table in association with the object ID included in the combination P1 to the user ID obtained from the authentication server 12.

In the case 3, when the user ID, which is variable and unique authentication information, is utilized for another application, successful authentication may cause a problem. For instance, when a user ID is used as an ID for single sign-on, a situation may occur in which login to another server should not be allowed, but the login to another server is allowed. To cope with this, the determination unit 36 may cause authentication of a user to the terminal apparatus 10 to fail. Alternatively, the user ID after the update may be used as the ID for single sign-on.

Processing for Case 4

The processing for the case 4 is performed when the user ID included in the combination P1 does not match the user ID included in the combination P2, and the object ID included in the combination P1 does not match the object ID included in the combination P2. In this case, the determination unit 36 determines that the user who has passed an IC card and the actual user associated with the combination P2 are different users, and causes authentication of the user to the terminal apparatus 10 to fail. In other words, when the combination P2 same as the combination P1 is not registered in the server side management table, the determination unit 36 causes authentication of the user to the terminal apparatus 10 to fail.

Hereinafter, an example of the flow of processing performed by the information processing system according to the exemplary embodiment will be described with reference to FIG. 7. FIG. 7 is a sequence diagram illustrating an example of the flow of the processing. Here, it is assumed that authentication of the user α to the terminal apparatus 10 is performed. Also, the user ID registered in the server side management table is not changed. The IC card ID "11111" is recorded on the IC card of the user α.

First, the user α passes the IC card of himself/herself over a reading device provided in the terminal apparatus 10 (S01). Thus, the IC card ID "11111" is read from the IC card by the reading device.

The processing unit 24 receives the IC card ID "11111" read from the reading device, and retrieves the user ID and the object ID which are associated with the IC card ID "11111" in the terminal side management table (S02). As illustrated in FIG. 4, the IC card ID "11111" is associated with the user ID "user A" and the object ID "abcdefgh", thus the user ID "user A" and the object ID "abcdefgh" are retrieved.

The processing unit 24 obtains the combination of the user ID "user A" and the object ID "abcdefgh" from the terminal side management table (S03).

Next, the processing unit 24 transmits the user ID "user A" to the authentication unit 34 to request authentication of the user to the authentication unit 34 (S04).

As illustrated in FIG. 5, the user ID same as the user ID "user A" transmitted from the terminal apparatus 10 is registered in the server side management table, thus the authentication unit 34 causes authentication of the user to the authentication server 12 to succeed (S05). Thus, the user α who has passed the IC card over the reading device is authenticated as the actual user α associated with the user ID "user A". The authentication unit 34 transmits to the terminal apparatus 10 information indicating successful authentication of the user to the authentication server 12.

When receiving from the authentication server 12 the information indicating successful authentication of the user to the authentication server 12, the processing unit 24 requests the authentication server 12 to obtain the object ID associated with the user ID "user A" (S06). For instance, the processing unit 24 transmits the user ID "user A" to the authentication server 12. When receiving the user ID "user A" transmitted from the terminal apparatus 10, the authentication unit 34 retrieves the object ID "abcdefgh" associated with the user ID "user A" in the server side management table, and transmits the object ID "abcdefgh" to the terminal apparatus 10.

The processing unit 24 receives the object ID "abcdefgh" transmitted from the authentication server 12 (S07). In this manner, the processing unit 24 obtains the object ID managed by the authentication server 12.

Next, the processing unit 24 transmits to the determination unit 36 of the authentication server 12 the combination P1 of the user ID "user A" and the object ID "abcdefgh" obtained from the terminal side management table, and the combination P2 of the user ID "user A" used for obtaining the object ID from the authentication server 12 and the object ID "abcdefgh" obtained from the authentication server 12 (S08).

The user ID "user A" included in the combination P1 matches the user ID "user A" included in the combination P2, and the object ID "abcdefgh" included in the combination P1 matches the object ID "abcdefgh" included in the combination P2. This case corresponds to the case 1 described above, and the determination unit 36 causes authentication of the user to the terminal apparatus 10 to succeed (S09). The user α who has passed the IC card is authenticated as the user α.

Information indicating successful authentication of the user to the terminal apparatus 10 is transmitted from the authentication server 12 to the terminal apparatus 10.

Consequently, the user α is allowed to log in to the terminal apparatus 10.

The processing unit 24 may obtain information registered in the authentication server 12 from the authentication server 12. As illustrated in FIG. 5, as an example, each user ID is associated with an electronic mail address in the server side management table. When the processing unit 24 requests the authentication server 12 to obtain an electronic mail address registered in the server side management table in association with the user ID "user A" of the user successfully authenticated, the electronic mail address is transmitted from the authentication server 12 to the terminal apparatus 10. The terminal apparatus 10 may transmit data to the electronic mail address. For instance, when the terminal apparatus 10 is a multifunctional apparatus, the multifunctional apparatus may transmit image data to the electronic mail address, the image data being generated by scanning a document and attached to an electronic mail. Alternatively, the terminal apparatus 10 may obtain the address of a storage region as information other than the electronic mail address, and may transmit data such as the image data to the storage region.

Hereinafter, the processing performed when a user ID registered in the server side management table is changed will be described with reference to FIGS. 8 and 9. FIG. 8 illustrates an example of the server side management table after a user ID is changed. FIG. 9 is a sequence diagram illustrating an example of the flow of the processing.

In the server side management table, as illustrated in FIG. 5, the actual user α is originally associated with the user ID "user A", but the user ID is changed and as illustrated in FIG. 8, the actual user α is associated with a new user ID "user C". For instance, a user ID may be changed by an administrator of the authentication server 12. Also, as illustrated in FIG. 8, an actual user β is associated with the user ID "user A". Since the user α is no longer associated with the user ID "user A", the user β other than the user α may be associated with the user ID "user A". For instance, when a new user β is registered in the authentication server 12, the user ID "user A" which is no longer used may be associated with the user β. It is to be noted that the object ID of any user is not changed in the server side management table.

The user ID and the object ID registered in the terminal side management table are not changed. As illustrated in FIG. 4, the IC card ID "11111" registered in the IC card owned by the user α is associated with the user ID "user A" and the object ID "abcdefgh".

First, the user α passes the IC card of himself/herself over a reading device provided in the terminal apparatus 10 (S10). Thus, the IC card ID "11111" is read from the IC card by the reading device.

The processing unit 24 receives the IC card ID "11111" read by the reading device, and retrieves the user ID and the object ID which are associated with the IC card ID "11111" in the terminal side management table (S11). As illustrated in FIG. 4, the IC card ID "11111" is associated with the user ID "user A" and the object ID "abcdefgh", thus the user ID "user A" and the object ID "abcdefgh" are retrieved.

The processing unit 24 obtains the combination of the retrieved user ID "user A" and object ID "abcdefgh" from the terminal side management table (S12).

Next, the processing unit 24 transmits the user ID "user A" to the authentication unit 34 to request authentication of the user to the authentication unit 34 (S13).

As illustrated in FIG. 8, the user ID same as the user ID "user A" transmitted from the terminal apparatus 10 is registered in the server side management table, thus the authentication unit 34 causes authentication of the user to the authentication server 12 to succeed (S14). Thus, the user α who has passed the IC card over a reading device is authenticated as the actual user α associated with the user ID "user A". Actually, the user β is associated with the user ID "user A", thus the user α who has passed the IC card over the reading device is authenticated as the actual user 3. The authentication unit 34 transmits to the terminal apparatus 10 information indicating successful authentication of the user to the authentication server 12.

When receiving from the authentication server 12 the information indicating successful authentication of the user to the authentication server 12, the processing unit 24 requests the authentication server 12 to obtain the object ID associated with the user ID "user A" (S15). For instance, the processing unit 24 transmits the user ID "user A" to the authentication server 12. When receiving the user ID "user A" transmitted from the terminal apparatus 10, the authentication unit 34 retrieves the object ID "ijklmnopq" associated with the user ID "user A" in the server side management table, and transmits the object ID "ijklmnopq" to the terminal apparatus 10.

The processing unit 24 receives the object ID "ijklmnopq" transmitted from the authentication server 12 (S16). In this manner, the processing unit 24 obtains the object ID managed by the authentication server 12.

Next, the processing unit 24 transmits to the determination unit 36 of the authentication server 12 the combination P1 of the user ID "user A" and the object ID "abcdefgh" obtained from the terminal side management table, and the combination P2 of the user ID "user A" used for obtaining the object ID from the authentication server 12 and the object ID "ijklmnopq" obtained from the authentication server 12 (S17).

The user ID "user A" included in the combination P1 matches the user ID "user A" included in the combination P2, and the object ID "abcdefgh" included in the combination P1 does not match the object ID "ijklmnopq" included in the combination P2. This case corresponds to the case 2 described above, and the determination unit 36 causes authentication of the user to the terminal apparatus 10 to fail (S18). In this manner, when a user ID is changed in the server side management table, and the corresponding object IDs do not match, authentication of the user to the terminal apparatus 10 fails.

If an object ID is not used, the user ID "user A" associated with the IC card ID "11111" is registered as the actual user β in the server side management table, thus the authentication succeeds. In other words, even though the user who has passed an IC card is not the user β, the user is authenticated as the user β, and is allowed to log in to the terminal apparatus 10. In the exemplary embodiment, an object ID is used, thus even when the user ID "user A" associated with the IC card ID "11111" is registered in the server side management table, the authentication fails, and the user who has passed an IC card is not allowed to log in to the terminal apparatus 10.

Hereinafter, a specific example of each case will be described.

Specific Example of Case 1

The case 1 will be described with reference to FIG. 10. FIG. 10 illustrates an example of the terminal side management table and the server side management table. In the terminal side management table, the IC card ID "11111" recorded on an IC card is associated with a user ID "user A" and an object ID "abcde". Also, in the server side management table, the actual user α is associated with the user ID "user A" and the object ID "abcde". The combination P1 of the user ID "user A" and the object ID "abcde" registered in the terminal side management table matches the combination P2 of the user ID "user A" and the object ID "abcde" registered in the server side management table. Therefore, when an IC card on which the IC card ID "11111" is recorded is passed over a reading device, and the IC card ID "11111" is read by the reading device, authentication of the user to the terminal apparatus 10 succeeds. The user who has passed the IC card is authenticated as the user α associated with the user ID "user A", and is allowed to log in to the terminal apparatus 10.

Specific Example of Case 2

The case 2 will be described with reference to FIG. 11. FIG. 11 illustrates an example of the terminal side management table and the server side management table. The server side management table illustrated in FIG. 10 is the table before change, and the server side management table illustrated in FIG. 11 is the table after the change.

In the terminal side management table illustrated in FIG. 11, the IC card ID "11111" recorded on an IC card is associated with the user ID "user A" and the object ID "abcde". Also, in the server side management table illustrated in FIG. 11, the actual user α is associated with the user ID "user C" and the object ID "abcde". In addition, the actual user β is associated with the user ID "user A" and the object ID "fghij". In other words, in the server side management table, the user ID of the user α is changed from the "user A" to the "user C", and the "user A" is registered as the user ID of the user β.

The combination P1 of the user ID "user A" and the object ID "abcde" registered in the terminal side management table does not match the combination P2 of the user ID "user A" and the object ID "fghij" registered in the server side management table. Therefore, when an IC card on which the IC card ID "11111" is recorded is passed over a reading device, and the IC card ID "11111" is read by the reading device, authentication of the user to the terminal apparatus 10 fails. The user who has passed the IC card is not allowed to log in to the terminal apparatus 10.

Specific Example of Case 3

The case 3 will be described with reference to FIGS. 12 to 14. FIGS. 12 to 14 illustrate an example of the terminal side management table and the server side management table.

The server side management table illustrated in FIG. 12 is the table before a user ID is changed. The server side management table illustrated in FIG. 13 is the table after the user ID is changed.

In the terminal side management table illustrated in FIG. 12, the IC card ID "11111" is associated with the user ID "user A", the object ID "abcde", and a token "token A", and an IC card ID "22222" is associated with a user ID "user B", the object ID "fghij", and a token "token B". In addition, in the server side management table, the actual user α is associated with the user ID "user A", the object ID "abcde", and the token "token A", and the actual user β is associated with the user ID "user B", the object ID "fghij", and the token "token B". A token is information assigned to a user when the user is authenticated by another authentication method using information other than the user ID which is an example of authentication information. The token is information indicating that a user associated with the token is authenticated by the authentication method. When a user is authenticated by the authentication method, the user ID and the object ID are associated with the token in the terminal side management table and the server side management table.

The combination P1 of the user ID "user A" and the object ID "abcde" registered in the terminal side management table matches the combination P2 of the user ID "user A" and the object ID "abcde" registered in the server side management table. Therefore, when an IC card on which the IC card ID "11111" is recorded is passed over a reading device, and the IC card ID "11111" is read by the reading device, authentication of the user to the terminal apparatus 10 succeeds. The user who has passed the IC card is authenticated as the user α associated with the user ID "user A", and is allowed to log in to the terminal apparatus 10.

The combination P1 of the user ID "user B" and the object ID "fghij" registered in the terminal side management table matches the combination P2 of the user ID "user B" and the object ID "fghij" registered in the server side management table. Therefore, when an IC card on which the IC card ID "22222" is recorded is passed over a reading device, and the IC card ID "22222" is read by the reading device, authentication of the user to the terminal apparatus 10 succeeds. The user who has passed the IC card is authenticated as the user β associated with the user ID "user B", and is allowed to log in to the terminal apparatus 10.

It is assumed that in the server side management table, the user ID of the user α is changed from the "user A" to the "user C", and the user ID of the user β is changed to the "user B". FIG. 13 illustrates tables after a user ID is changed. Although the user ID registered in the server side management table has been changed, the user ID registered in the terminal side management table has not been changed.

The combination P1 of the user ID "user A" and the object ID "abcde" registered in the terminal side management table does not match the combination P2 of the user ID "user A" and the object ID "fghij" registered in the server side management table. However, the same combination as the combination of the token "token A" and the object ID "abcde" associated with the user ID "user A" registered in the terminal side management table is registered in the server side management table in association with the user ID "user C". Therefore, when an IC card on which the IC card ID "11111" is recorded is passed over a reading device, and the IC card ID "11111" is read by the reading device, authentication of the user to the terminal apparatus 10 succeeds. The user who has passed the IC card is authenticated as the user α associated with the user ID "user C", and is allowed to log in to the terminal apparatus 10.

The processing unit 24 obtains from the authentication server 12 the user ID "user C" associated with the token "token A" and the object ID "abcde", and as illustrated in FIG. 14, the user ID "user A" registered in the terminal side management table in association with the IC card ID "11111" may be updated to the user ID "user C".

When the user ID "user A" is changed to the user ID "user B" and the original user ID "user B" is not changed in the server side management table, the user ID "user B" is duplicated in the server side management table. Even in this case, the combination P1 of the user ID "user B" and the object ID "fghij" associated with the IC card ID "22222" in the terminal side management table does not match the combination P2 of the user ID "user B" and the object ID "abcde" registered in the server side management table, thus the user who has passed the IC card, on which the IC card ID "22222" is recorded, is not authenticated as the user α. In this case, the combination P1 of the user ID "user B" and the object ID "fghij" associated with the IC card ID "22222" in the terminal side management table matches the combination P2 of the user ID "user B" and the object ID "fghij" registered in the server side management table, thus the user who has passed the IC card, on which the IC card ID "22222" is recorded, is authenticated as the user β.

In the exemplary embodiment described above, each IC card ID is associated with a user ID and an object ID in the terminal side management table, however, instead of the IC card ID, information other than the IC card ID for identifying a user may be associated with a user ID and an object ID. For instance, biological information (for instance, fingerprint, retina, face, blood vessels, and voice) on a user may be associated with a user ID and an object ID. In this case, when biological information on a user is read by a reading device, the user ID and the object ID, with which the read information is associated, are identified.

In the exemplary embodiment described above, the authentication server 12 has the determination unit 36, and authenticates a user to the terminal apparatus 10, however, the processing of the determination unit 36 may be performed by an apparatus (for instance, a determination apparatus) other than the authentication server 12. In short, the determination unit 36 may be implemented by a determination apparatus other than the authentication server 12. The determination apparatus having the determination unit 36 includes, for instance, a communication device, an UI, a memory, and a processor, and has a function of communicating with the terminal apparatus 10 and the authentication server 12 via a communication path N. For instance, the determination apparatus receives from the terminal apparatus 10 a combination of a user ID and an object ID, and causes authentication of a user to the terminal apparatus 10 to succeed or fail, the user ID being an example of the authentication information, the object ID being an example of the fixed information. In this case, the authentication server 12 may not have the determination unit 36.

In the exemplary embodiment described above, the terminal apparatus 10 has the management unit 22 and the processing unit 24. However, the processing of the management unit 22 and the processing unit 24 may be performed by an apparatus (for instance, a processing apparatus) other than the terminal apparatus 10. In short, the management unit 22 and the processing unit 24 may be implemented by a processing apparatus other than the terminal apparatus 10. The processing apparatus having the management unit 22 and the processing unit 24 includes, for instance, a communication device, an UI, a memory, and a processor, and has a function of communicating with the terminal apparatus 10 and the authentication server 12 via a communication path N. The terminal side management table may be stored in the processing apparatus. For instance, when an IC card ID recorded on an IC card is read by a reading device, the IC card ID is transmitted from the reading device to the processing apparatus. The processing unit 24 of the processing apparatus performs the same processing as that performed by the processing unit 24 described above. For instance, the processing unit 24 of the processing apparatus performs the processing in S02 to S08 illustrated in FIG. 7. In this case, the terminal apparatus 10 may not have the management unit 22 and the processing unit 24. In addition, the terminal side management table may not be stored in the terminal apparatus 10.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic apparatus).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a memory and a processor,
the memory being configured to, for each of users,
store authentication information and fixed information in association with the user, the authentication information being variable and unique, the fixed information being invariant and unique,
the processor being configured to:
receive the authentication information and the fixed information from an apparatus utilized by the user, and
cause authentication of the user to the apparatus to succeed or fail according to a result of comparison between a combination of the received authentication information and fixed information and a combination of the authentication information and the fixed information stored in the memory, wherein
the authentication information includes a user ID, and
when the received user ID does not match the user ID stored in the memory and the received fixed information matches the fixed information stored in the memory, the processor causes authentication of the user to the apparatus to succeed.

2. The information processing apparatus according to claim 1, wherein the variable and unique authentication information is used for authentication of the user to the apparatus, and
when the received authentication information matches the authentication information stored in the memory, the processor further causes authentication of the user to the apparatus to succeed.

3. The information processing apparatus according to claim 2, wherein when the received authentication information matches the authentication information stored in the memory and the received fixed information does not match the fixed information stored in the memory, the processor causes authentication of the user to the apparatus to fail.

4. The information processing apparatus according to claim 3, wherein the processor further transmits information to the apparatus, the information for inquiring of the user whether or not the authentication information and the fixed information on the user, of which authentication to the apparatus has failed, are deleted from the memory.

5. The information processing apparatus according to claim 1, wherein when the received authentication information matches the authentication information stored in the memory and the received fixed information does not match the fixed information stored in the memory, the processor causes authentication of the user to the apparatus to fail.

6. The information processing apparatus according to claim 5, wherein the processor further transmits information to the apparatus, the information for inquiring of the user whether or not the authentication information and the fixed information on the user, of which authentication to the apparatus has failed, are deleted from the memory.

7. An information processing system comprising:
an information processing apparatus; and
an apparatus utilized by users,
the information processing apparatus including a first memory and a first processor,
the first memory being configured to, for each of the users,
store authentication information and fixed information in association with the user, the authentication information being variable and unique, the fixed information being invariant and unique,
the apparatus including a second memory and a second processor,
the second memory being configured to, for management information,
store the authentication information and the fixed information in association with the management information,
the second processor being configured to receive management information, and transmit to the information processing apparatus a combination of the authentication information and the fixed information associated with the received management information,
the first processor being configured to:
receive the combination of the authentication information and the fixed information transmitted from the apparatus, and
cause authentication of the user to the apparatus to succeed or fail according to a result of comparison between the combination of the received authentication information and fixed information and a combination of the authentication information and the fixed information stored in the first memory, wherein
the authentication information includes a user ID, and
when the received user ID does not match the user ID stored in the first memory and the received fixed information matches the fixed information stored in the first memory, the first processor causes authentication of the user to the apparatus to succeed.

8. A non-transitory computer readable medium storing a program causing a computer to execute a process, the computer including a memory configured to, for each of users, store authentication information and fixed information in association with the user, the authentication information being variable and unique, the fixed information being invariant and unique,
the processor being configured to:
receive the authentication information and the fixed information from an apparatus utilized by the user, and
cause authentication of the user to the apparatus to succeed or fail according to a result of comparison between a combination of the received authentication information and fixed information and a combination of the authentication information and the fixed information stored in the memory, wherein the authentication information includes a user ID, and
when the received user ID does not match the user ID
stored in the memory and the received fixed information matches the fixed information stored in the memory, the processor causes authentication of the user to the apparatus to succeed.

\* \* \* \* \*